United States Patent

Bouwman

Patent Number: 5,946,905
Date of Patent: Sep. 7, 1999

[54] OPTIMIZATION CONTROL FOR GAS ENGINES WITH A THREE-WAY CATALYST

[75] Inventor: Willem Hendrik Bouwman, Apeldoorn, Netherlands

[73] Assignee: Gastec N.V., Apeldoorn, Netherlands

[21] Appl. No.: 08/894,290

[22] PCT Filed: Feb. 19, 1996

[86] PCT No.: PCT/NL96/00079

§ 371 Date: Nov. 6, 1997

§ 102(e) Date: Nov. 6, 1997

[87] PCT Pub. No.: WO96/25594

PCT Pub. Date: Aug. 22, 1996

[30] Foreign Application Priority Data

Feb. 17, 1995 [NL] Netherlands ............................ 9500318

[51] Int. Cl.$^6$ .................................................... F01N 3/00
[52] U.S. Cl. ................................ 60/274; 60/276; 60/285; 123/681
[58] Field of Search ............................ 60/274, 276, 285; 123/681

[56] References Cited

U.S. PATENT DOCUMENTS

| | | | |
|---|---|---|---|
| 4,953,351 | 9/1990 | Motz et al. | 60/285 |
| 5,233,829 | 8/1993 | Komatsu | 60/276 |
| 5,325,664 | 7/1994 | Seki et al. | 60/285 |
| 5,542,248 | 8/1996 | Iwata et al. | 60/285 |

FOREIGN PATENT DOCUMENTS

| | | |
|---|---|---|
| 0182073 | 5/1986 | European Pat. Off. |
| 3822415 | 5/1989 | Germany |
| 3830687 | 3/1990 | Germany |
| 4311890 | 10/1994 | Germany |
| 6167210 | 6/1994 | Japan |
| 9402729 | 2/1994 | WIPO |

*Primary Examiner*—Thomas E. Denion
*Attorney, Agent, or Firm*—Weingarten, Schurgin, Gagnebin & Hayes LLP

[57] ABSTRACT

The invention relates to a process for controlling the fuel-air ratio for a gas engine which is provided with one or more λ (1) sensors and a three-way catalyst, as well as a control system for adjusting the fuel-air ratio by means of a control element on the basis of the signal of a first λ (1) sensor, comprising stepwise adjusting the λ (1) value at regulated intervals, at constant load of the engine, and measuring the corresponding activity of the catalyst, determining the corresponding measuring signals of the λ (1) sensor, and determining the value of the measuring signal at which the activity of the catalyst considerably increases or decreases, followed by adjusting the value of the control signal of the λ (1) sensor which is maintained as the desired control value on the basis of the latter measuring signal.

16 Claims, 5 Drawing Sheets

Lambda window of a three-way catalyst

Lambda window of a three-way catalyst

Decreasing lambda signal due to ageing of the lambda signal

Practical measurements of the influence of ageing of the lambda sensor on the lambda signal Influence of the ageing of a three-way catalyst on the emissions of $NO_x$, CO, and $C_xH_y$.

Lambda signal and emissions of $NO_x$ and $CH_4$ during the optimization process Lambda signal and temperature curves before and after the three-way catalyst during the optimization process Progressive average of the lambda signal and temperature curve after catalyst

OPTIMIZATION CONTROL FOR GAS ENGINES WITH A THREE-WAY CATALYST

FIELD OF THE INVENTION

The present invention relates to an optimization control for gas engines with a three-way catalyst and more in particular to the use of such an optimization control during the operation of gas engines which are provided with a $\lambda$ sensor and a controlled three-way catalyst.

BACKGROUND

Total energy plants with gas engines show a higher emission of noxious components than other electricity generators. In order to drastically reduce these emissions ($NO_x$ and unbrined components), a three-way catalyst can be used. It is necessary for the proper functioning of the three-way catalyst that the gas-air ratio of the mixture supplied to the gas engine is kept constant. The gas-air ratio can be indicated by the air factor $\lambda$.

The object of a $\lambda$ control is to keep the composition of the gas-air mixture supplied to the engine very close to the optimum working point of the three-way catalyst by making use of a closed control circuit. The maximum deviation from the working point is determined by the so-called $\lambda$ window. Within this window are all the values of $\lambda$, for which it applies that the emission of all the noxious exhaust gas components remains below the maximum limits fixed for these components.

The lower and upper limits of the $\lambda$ window are determined by an exhaust gas component which at a lower or higher $\lambda$ value exceeds the maximum emission permissible for this component. In case of a properly functioning three-way catalyst, the emission of carbon monoxide (CO) is decisive of the lower limit, and the emission of nitrogen oxides ($NO_x$) is decisive of the upper limit of the $\lambda$ window. This is shown in FIG. 1.

Earlier research and experiences from demonstration projects show that problems arise with the existing techniques to keep within the $\lambda$ window. By ageing and wear of the sensor, the air factor gradually changes. The three-way catalyst then no longer works at its optimum working point, and the emissions of noxious substances impermissibly increase. The applicant has done research to solve this problem. This research has led to the development of an optimization method for periodically determining the value of the $\lambda$ signal which corresponds to the optimum value of the fuel-air ratio for the proper functioning of the three-way catalyst.

In the Netherlands, in contrast to other countries such as Germany, Austria, and Switzerland, few gas engines with a three-way catalyst are used. Much more use is made of another $NO_x$ limiting technique, namely the lean mixture gas engine. Although the potency of these lean mixture techniques is high, the use of particularly catalytic cleaning methods seems unavoidable, if the emission requirements are made more stringent in the future. The branch in which uses with three-way catalysts can be expected soonest is the greenhouse horticulture.

In this branch not only the generated electricity and heat, but also the combustion gases of a total energy plant can be used for $CO_2$ fertilization, provided these gases do not contain too many noxious components. Apart from saving energy, this is also of economic advantage. For $CO_2$ fertilization the $NO_x$ emission must be considerably lower then the present legal requirement of 140 g/Gj. Besides, limiting values are also imposed on other noxious components. A three-way catalyst is satisfactory here, as has been demonstrated both in applicant's laboratory and in practice, but exact control of air factor $\lambda$ by means of a $\lambda$ sensor is then necessary.

A $\lambda$ sensor comprises a small sheet of a ceramic material consisting of zirconium dioxide ($ZrO_2$) stabilized by means of yttrium oxide ($Y_2O_3$), provided on both sides with thin platinum electrodes permeable to gas. One of these electrodes comes into contact with the exhaust gases. This electrode functions as a small catalyst. The other electrode is in contact with the ambient air and serves as reference electrode with respect to the oxygen concentration.

It should be observed that only at temperatures above ca. 300° C. is the electrical resistance of the ceramic material sufficiently low for practical use. At this temperature the time lapsed between the moment when changes occur in the gas-air mixture and the moment of change of the $\lambda$ signal is still in the order of seconds, however. This reaction time of the $\lambda$ sensor largely depends on the temperature. At a temperature of 600° C. this is reduced to less than 50 ms.

A three-way catalyst converts hydrocarbons, carbon monoxide, and nitrogen oxides having a high to very high conversion efficiency into substances that are not or less noxious. Here it is necessary that the gas-air mixture burned in the engine has an air factor which is only slightly different from 1. In practice, therefore, engines of which the exhaust gases are cleaned by a three-way catalyst are referred to as $\lambda=1$ engines. This practically stoichiometric gas-air mixture must be maintained as the optimum working point under all the operating conditions. This stringent requirement cannot even be satisfied by the most advanced fuel systems without a feedback control. It is therefore necessary to use a so-called $\lambda$ control.

In practice, the $\lambda$ control operates as follows. Depending on the composition of the exhaust gases, the sensor produces a signal, and depending thereon, the fuel-air ratio is corrected.

The $\lambda$ sensor is mounted at a location in the exhaust gas system where all the exhaust gases pass.

The width of the $\lambda$ window is determined by the emission of noxious exhaust gas components by the gas engine before the three-way catalyst (more emission→narrower $\lambda$ window), the conversion efficiency of the three-way catalyst for each of the noxious components separately, largely depending on the degree of ageing (more ageing→narrower $\lambda$ window), and the limits of the maximum emission permissible for each of the components (more stringent requirements→narrower $\lambda$ window). When the $\lambda$ window becomes narrower, it is necessary to control (even) more accurately. When the $\lambda$ window has become very narrow, it is better for computer control to have a bit too little gain and too large a time constant. Thus overshoot is prevented and the emission keeps within the limits.

Optimization of the $\lambda$ control is necessary, because both the $\lambda$ sensor and the three-way catalyst is susceptible to ageing. Owing to ageing of the three-way catalyst, the $\lambda$ window changes, and owing to ageing of the $\lambda$ sensor, the $\lambda$ signal no longer corresponds to the desired $\lambda$ value within the $\lambda$ window. Optimization is necessary to ensure low emissions of noxious components for a longer period of time.

Ageing of the $\lambda$ sensor and the three-way catalyst depends on the specific use, the process quantities of the use, the number of service hours, the type of catalyst, the size of the catalyst, the type of sensor, the oil consumption of the engine, etc. The ageing process will therefore be different in each situation.

The ageing of the λ sensor manifests itself in general as the gradual decrease of the sensor voltage with an increasing number of service hours at a constant gas-air ratio and constant engine conditions. In the past the applicant already researched this ageing behavior of λ sensors. In general, when used in a gas engine, a λ sensor can stand a long time of use (>10,000 h). In order to prevent thermal damage to the catalytically active outer layer of the ceramic material, the temperature of the sensor may not rise too much. For a longer period of time the maximum temperature of the λ sensor may not exceed ca. 800° C. Higher temperatures lead to damage to the catalytic outer surface of the ceramic material and thus to accelerated ageing.

Another cause of ageing is contamination of the catalytic surface at the outside of the ceramic material.

The λ signal gradually decreases by ageing. The λ control is designed so as to keep the measured λ signal equal to the desired adjusted λ signal. Consequently, owing to the ageing of the λ sensor the gas-air mixture will be adjusted increasingly richer. This is diagrammatically shown in FIG. 2. With the lapse of time the real λ is no longer within the λ window of the three-way catalyst. Thus the emission of specific components of the exhaust gas becomes too high. This ageing is clearly shown in FIG. 3 for a practical situation.

It is clearly visible that at a fixed λ the measured λ signal after, for instance, 5501 service hours, is lower by about 50 mV than after 619 service hours. This difference is practically independent of the λ value. The characteristic of a λ sensor gradually shifts parallel downwards in the graph with the lapse of time. This voltage drop due to ageing of the λ sensor is different for each situation and each sensor. In case of specific λ sensors, immediately after being put into use, the phenomenon may occur that the λ signal increases during the first service hours, before the effect of gradual ageing occurs. In this situation, too, optimization is necessary.

FIG. 2 shows that at a λ sensor signal of 400 mV the fuel-air ratio practically does not change despite ageing of the sensor. In petrol cars equipped with a λ control and a three-way catalyst use is made of this reference point. This reference point is very regularly sought, and then the correcting element is so controlled (on a time base) that a richer mixture is formed. For gas engines this reference point is too remote from the λ sensor signal, which results in low emissions. Very regularly seeking the reference point results in (too) high $NO_x$ emissions, as a result of which this control system cannot be used in stationary gas engines. This control system is known from U.S. Pat. No. 4,526,001.

As in the case of the above ageing of the λ sensor, the service life of the three-way catalyst also largely depends on the exhaust gas temperature prevailing in the catalyst (thermal ageing process) as well as on the type and the concentration of fuel additions. Ageing of a catalyst means that the total active surface area is reduced. Consequently, the conversion efficiency decreases for all the components. This leads to an increasing emission of the noxious exhaust gas components as compared to the situation for a new catalyst. Hence the λ window becomes narrower, since the emission of noxious exhaust gas components increases on ageing, while the requirements for the maximum limits of course remain unchanged. A narrower λ window requires a more accurate adjustment of λ. FIG. 5 shows the effect of the ageing of the three-way catalyst on the emission of the different exhaust gas components. It is clearly visible that the emission levels of $C_xH_y$, CO, and $NO_x$ rise, and that, moreover, the λ value at which the conversion is optimal shifts to the richer side.

The above clearly shows that there is a need for a system for more or less continuously readjusting or optimizing the λ signal, in relation to the factual emission.

SUMMARY OF THE INVENTION

The invention is based on the surprising insight that it is readily possible to correct the adjustment of the optimum fuel-air ratio for the gas engine on the basis of the signal of the λ sensor by means of the activity of the catalyst.

The invention therefore relates to a process for controlling the fuel-air ratio for a gas engine which is provided with one or more λ sensors and a three-way catalyst, as well as a control system for adjusting the fuel-air ratio by means of a control element on the basis of the signal of a first λ sensor, comprising stepwise adjusting the λ value at regular intervals, at constant load of the engine, and measuring the corresponding activity of the catalyst, determining the corresponding measuring signals of the λ sensor, and determining the value of the measuring signal at which the activity of the catalyst considerably increases or decreases, followed by adjusting the value of the control signal of the λ sensor which is maintained as the desired control value on the basis of the latter measuring signal.

The invention also relates to a process for generating heat and/or electricity by means of a gas engine, which process also comprises the above control.

The conversion process in the three-way catalyst directly depends on the air factor λ of the gas-air mixture. The catalyst has the highest conversion efficiency for all the noxious components at a λ of about 0.995. As described, both the λ characteristic of the λ sensor and the optimum λ value of the three-way catalyst are influenced by ageing. The optimization method is directed to the periodic readjustment of the gas-air ratio such that the three-way catalyst can operate at the working point at which the conversion of the noxious components is optimal.

The optimization according to the invention occurs on the basis of a fixed reference point which is largely independent of the ageing of sensor and/or catalyst. During the optimization the system is first brought into equilibrium in the fuel-rich range, for instance $\lambda=0.989$, and then $\lambda$ is increased stepwise, for instance by steps of not more than 0.001, while bringing about the equilibrium. As soon as the optimum range has been traversed and an excess of oxygen enters the gas, a large increase in activity first occurs, followed by a large decrease of activity in the range of $\lambda>1,000$.

Before the activity of the catalyst decreases, a sudden increase of voltage of the signal of the $\lambda$ sensor takes place after the catalyst. This may serve as reference point to correct the control value. However, it is also possible to control at the NO content or the $O_2$ content after the catalyst. Because the $NO_x$ consists mainly of NO, an NO monitor may be used to correct the control value. For simplicity's sake, use is preferably made of a control on the basis of the signal of the $\lambda$ sensor after the catalyst. Within the scope of the invention, there is a great change of the activity, when the temperature changes more than 10 mV at a $\Delta\lambda$ of 0.002.

The following explanation of the invention is made chiefly on the basis of measurements of the $\lambda$ signal after the catalyst, but it will be clear that these controls are also possible on the basis of the other methods.

During the optimization the aim is to select the $\lambda$ value such that the conversion efficiency is optimal for all the noxious components. A high conversion efficiency is connected with a high temperature in the catalyst. The optimization process could be based on the maximum catalyst temperature. It turns out that, in practice, optimization on the basis of the maximum temperature in or after the catalyst does not always proceed in a reliable manner, as a result of which the optimum working point of the catalyst is not found.

It is important during the optimization to have a fixed reference point that can always be detected and does not shift on ageing of sensor and catalyst. Such a point can be found by determining the trend of the $\lambda$ sensor after the catalyst. Important is the point at which the signal suddenly increases or decreases.

Figure 1:
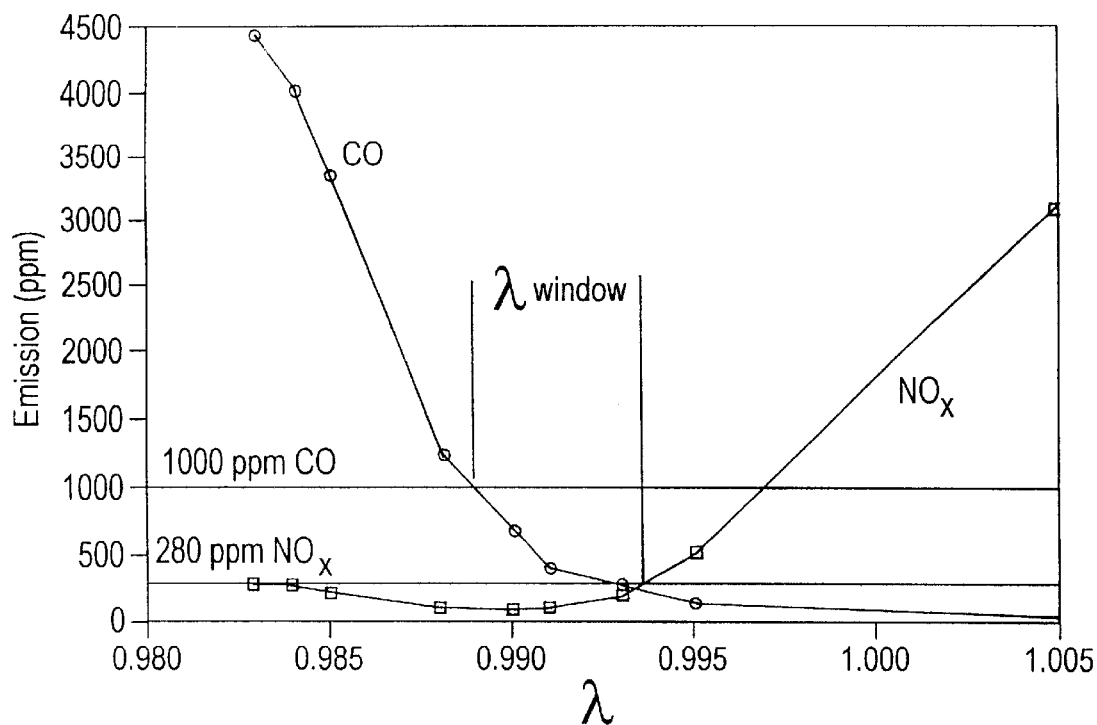
FIG. 1 depicts the lambda window of a three-way catalyst, in a plot of emission levels (ppm) against fuel-air ratio (λ)
Figure 2:
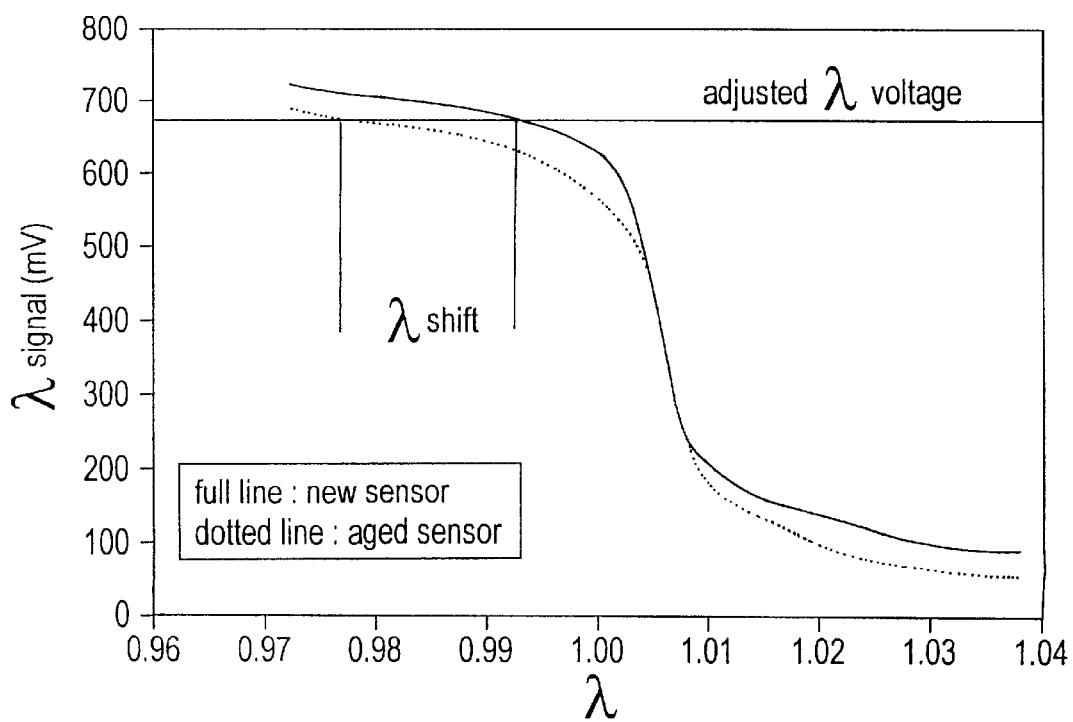
FIG. 2 is a plot of the λ signal (mV) of a new versus old sensor against their respective, actual λ values.
Figure 3:
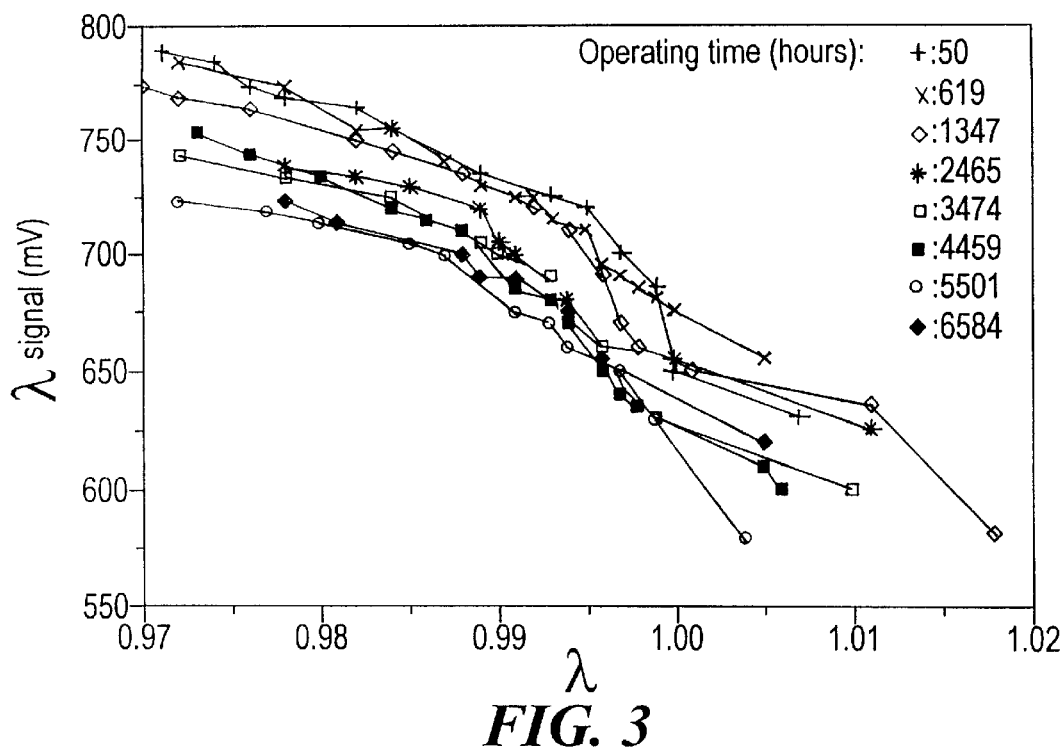
FIG. 3 is a plot depicting the influence of the ageing of a λ sensor on its λ signal (mV)
Figure 4:
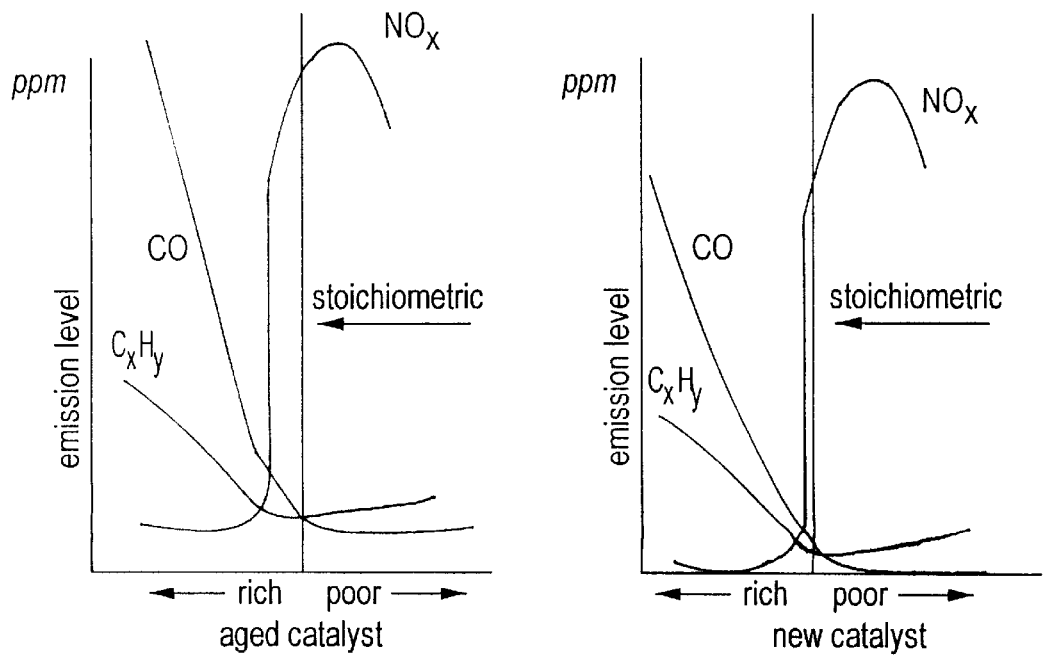
FIG. 4 shows two plots of emission levels (ppm) versus fuel-air ratios, from an aged and a new catalyst, depicting the influence of the ageing of a three-way catalyst on its $NO_x$, CO, and $C_xH_y$ emissions.
Figure 5:
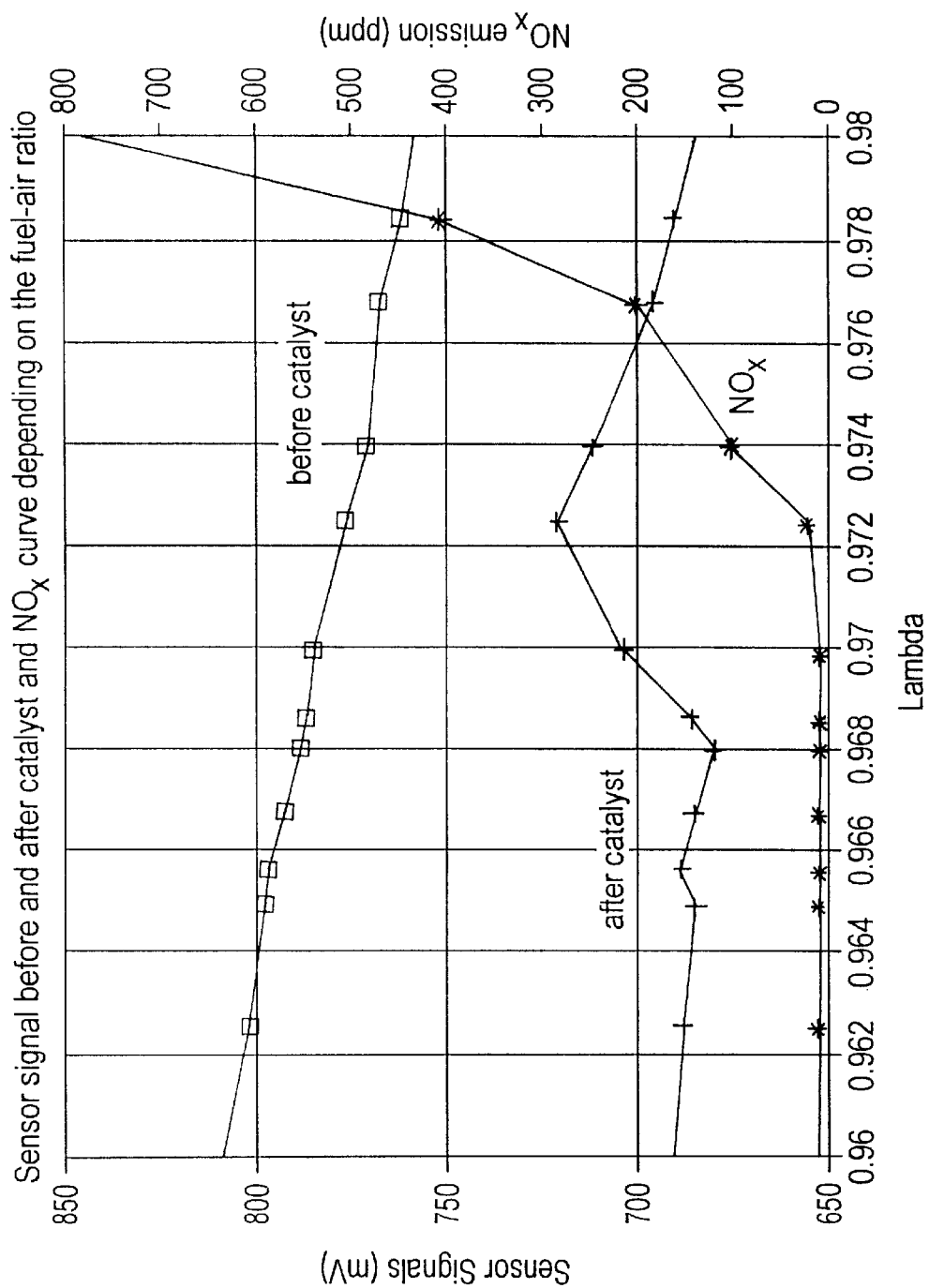
FIG. 5 is a graph showing the λ sensor signals (mV) at the sensors before and after the catalyst and $NO_x$ emission levels (ppm) as a function of the lambda value (λ)

FIG. 5 relates to a gas engine in a test arrangement. In this figure the signals of the $\lambda$ sensors before and after the catalyst and the $NO_x$ signal are plotted against the fuel-air ratio ($\lambda$). In the tests the fuel-air ratio is varied from small to great. At a small $\lambda$ there is a clear CO emission after the catalyst (>500 ppm). In the tests the $\lambda$ is increased by steps of about 0.001. Just before there is $NO_x$ emission after the catalyst, an increase in activity takes place in the catalyst. This results in a sudden considerable increase of the signal of the $\lambda$ sensor after the catalyst. When the signal decreases, there is $NO_x$ emission after the catalyst. The point of reaching the highest value of the sensor signal after the catalyst is the point of beginning release of free oxygen after the catalyst and of beginning increase of the $NO_x$ content after the catalyst.

The increase of the signal of the $\lambda$ sensor can be used as reference point. The reference point may also be the maximum value, a decreasing value or a combination thereof. A breakpoint can be used to adjust the control value. The fuel-air ratio of the gas engine can be controlled at the signal after the $\lambda$ sensor. This may be done, for instance, on the basis of the value found just before a defined increase of the sensor signal has taken place. It is also possible to determine, when a breakpoint is detected, the sensor signal before the catalyst. This may be a measured value, an average value of a number of measurements or a progressive average. This may then be controlled at, if required after a correction. The advantage of using two sensors is, among other things, that in case of failure of one sensor a change-over to the other sensor can be effected. This increases the reliability of the control.

Because of the highly fluctuating character of the $\lambda$ signal and in order to consider the trend of the sensor characteristic, use is preferably not made of the momentaneous $\lambda$ signal, but of the progressive average of preferably at least 5, but more in particular about 10 successive optimization values of the $\lambda$ signal. In order to obtain a good history of the signal, the $\lambda$ is sent to the rich range by means of the control valve. Subsequently, by controlling the control valve by small defined steps, a leaner gas-air mixture is proceeded to, until the activity of the catalyst first considerably increases and then considerably decreases. Between the controls of the valve there is a wait to express the effect of the $\lambda$ variation on the activity of the catalyst. The waiting time depends on the buffer action of the catalyst and can last for minutes.

The new desired $\lambda$ signal is obtained by adding a specific number of millivolts to or subtracting them from the progressive average of the $\lambda$ signal in order to obtain the correct control value. The research into the ageing of $\lambda$ sensors revealed that the characteristic of the sensor signal in the $\lambda$ window practically does not change but shifts in its entirety. In case of an aged or non-aged sensor, adding or subtracting a number of millivolts will then result in a similar $\lambda$ variation. The new $\lambda$ signal which is to be controlled at, must then correspond to the air factor at which the emission of the critical exhaust gas components is minimal. It will be clear that the determination of this optimum $\lambda$ signal can be carried out more accurately by reducing the step amount of $\lambda$ during the optimization process.

Perhaps unnecessarily, it should be observed that this optimization method only works if the power of the total energy plant is not changed during optimization. The fact is that modulation of the power results in a change of the temperature of the exhaust gases from the gas engine and thus in the three-way catalyst as well. It is also possible that a sudden change of gas pressure may change the composition of the gas in and after the gas engine. This disturbs the optimization process. If a sensor observes a defined change upstream of the catalyst, then the optimization process will be interrupted. A defined change may be a considerably increasing or decreasing $\lambda$ signal or a temperature change of the exhaust gases. Modulation between two optimizations is of course no problem.

Figure 6:
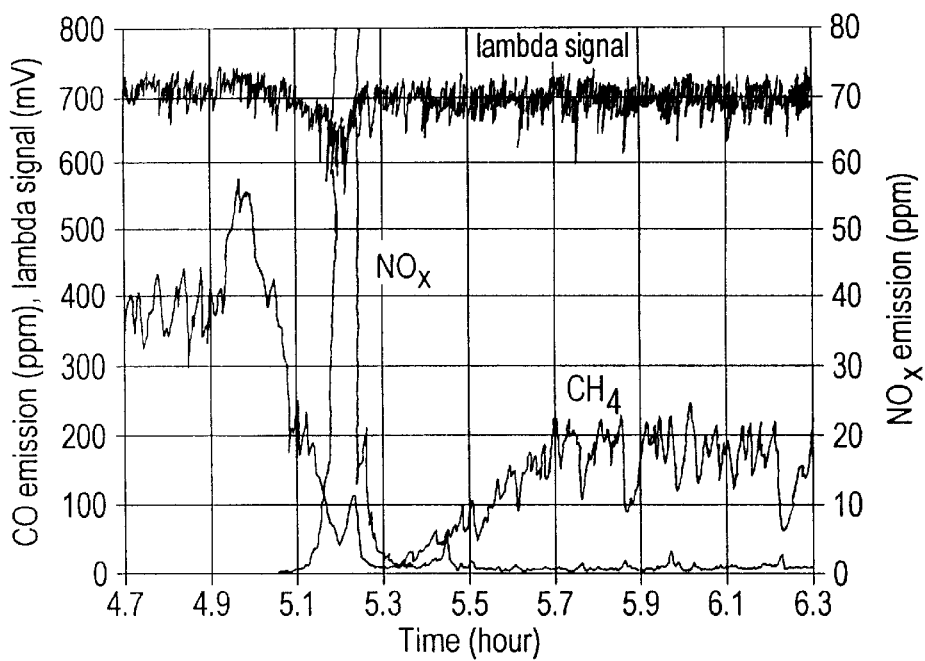
FIG. 6 a graph plotting both λ signal (mV) and CO and $NO_x$ emissions (ppm) over time (hours), during the optimization process.
Figure 7:
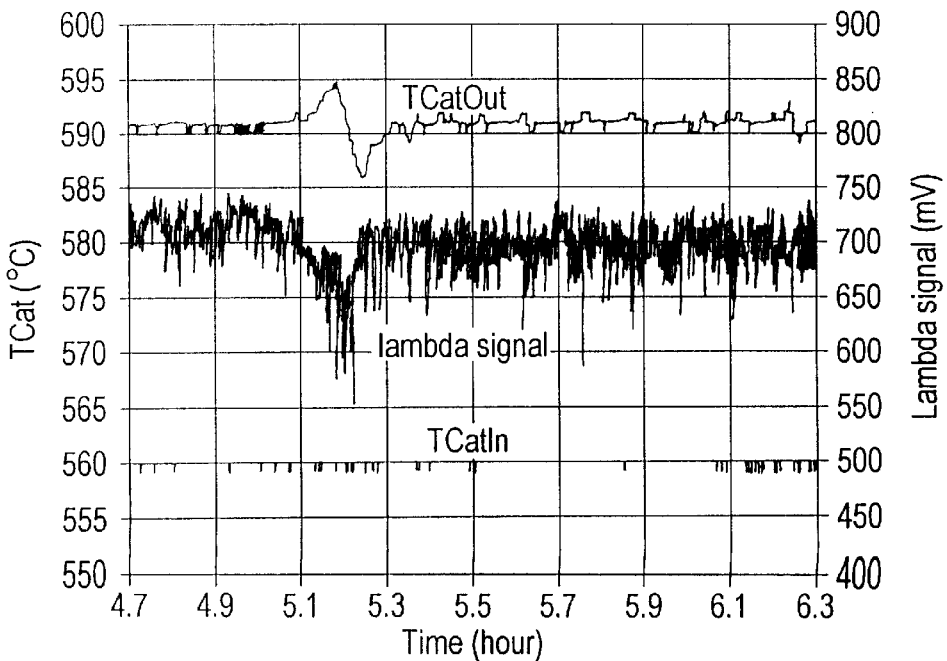
FIG. 7 is a graph plotting the catalyst temperature (°C.) and λ signal at the sensors before and after the three-way catalyst, during the optimization process.

As shown is FIGS. 6 and 7, the $NO_x$ emission may increase to high values during the optimization process. These values are much higher than the maximum value permissible for $CO_2$ fertilization. However, when determining this maximum value, it has been assumed that it must be possible to permanently expose the crop to this value. However, at a relatively short exposure time (in this experiment ca. 10 minutes) the crop can stand higher concentrations. The exposure to $NO_2$ can be taken as an instance: for 1 hour the crop can be exposed to 1.9 ppm $NO_2$, which corresponds to 225 ppm in a stoichiometric gas engine and a dilution up to 800 ppm $CO_2$ in the greenhouse. This short increase of the emissions due to optimization gives no rise to concentrations of noxious substances unacceptable to the crop in the greenhouse atmosphere. In general, optimization need not take more than ca. 30 minutes.

Figure 8:
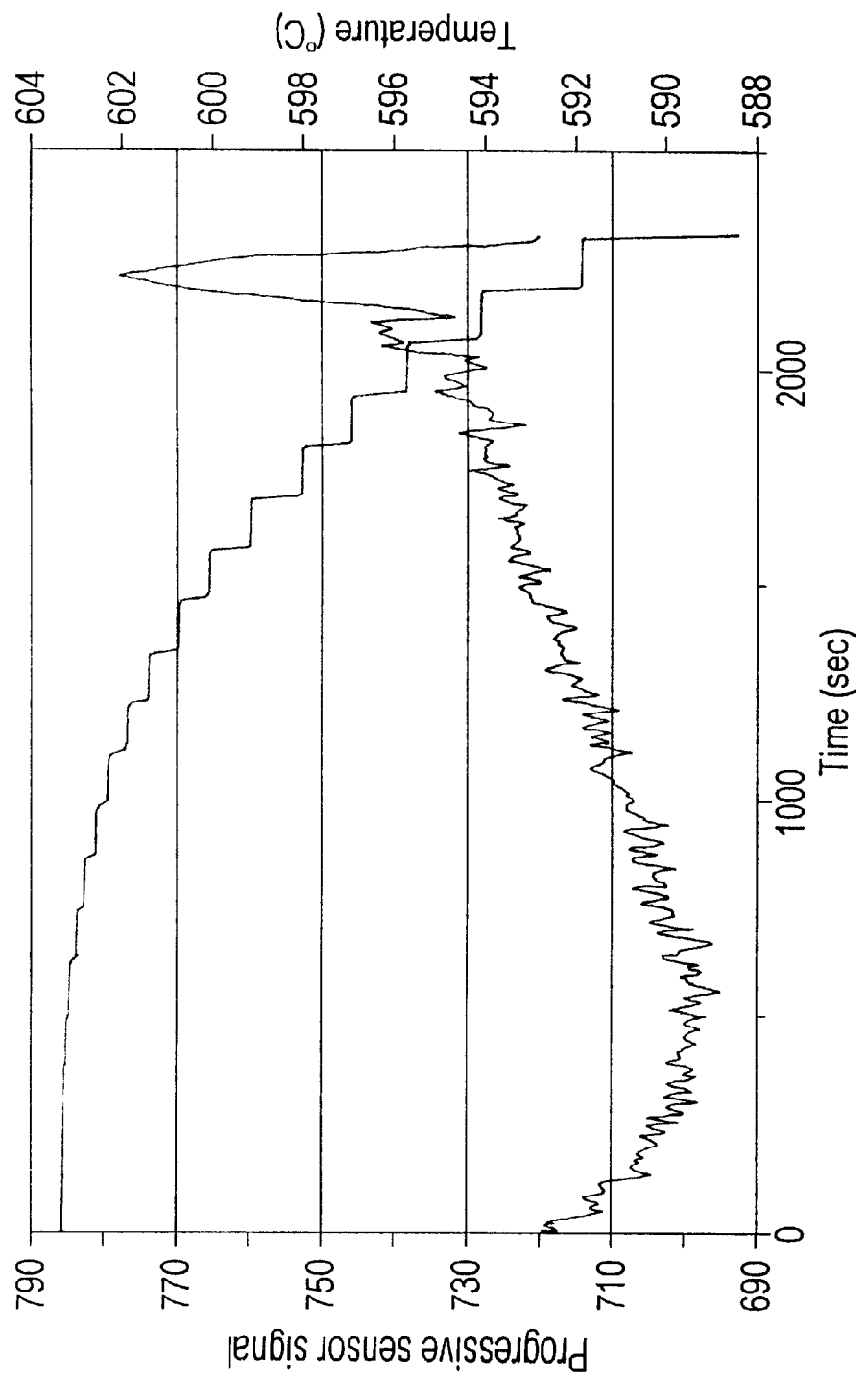
FIG. 8 is a graph depicting the progressive average of the lambda signal and temperature curve after the catalyst, as a function of time (sec).

FIG. 8 shows the considerable increase and decrease of temperature due to a changed conversion in the catalyst. In contrast to the momentaneous $\lambda$ sensor signal, the periodically determined progressive average shows no fluctuations.

The control of the gas-air ratio is connected with an optimization method which must ensure that the air factor of the gas-air mixture always keeps within the $\lambda$ window, despite ageing of the $\lambda$ sensor and the three-way catalyst. Thus the emissions of particularly CO and $NO_x$ remain below the maximum permissible values. If the exhaust gases are used for $CO_2$ fertilization, the $\lambda$ window on the rich side is not determined by the CO emission, but by the $NH_3$ emission. This is measured at a new catalyst. In this situation, too, the optimization control can be used and too high emissions of CO, $NO_x$, $NH_3$, and $C_2H_4$ are avoided.

After each change of power, optimization must preferably be effected. The fact is that a change of power is connected with a change of the λ signal, even if the gas-air ratio is not changed. In spite of the fact that use is made of a heated λ sensor, there is likely to be a connection with the temperature of the exhaust gases flowing past. Besides, dependence on the pressure in the exhaust system is not impossible. The fact is that the transport of the oxygen ions in the λ sensor is determined by, among other things, the temperature of the ceramic material of the λ sensor. Optimization after a change of the power is particularly important for a very aged catalyst in which the λ window has become very narrow.

In general, it may be said that at a constant load optimization must be effected with some regularity. The frequency thereof is dependent on, among other things, the age of the sensor, the age of the catalyst, and the specific use. In a new sensor, optimization must be effected more frequently, for instance once a day. When the sensor has aged, after about one month, it is sufficient to optimize once a week. If the use is not very critical, this frequency may even be reduced. However, when used in combination with an aged catalyst, the frequency must be increased again.

I claim:

1. A process for controlling the fuel-air ratio (λ) for a gas engine which is provided with at least one λ sensor, a three-way catalyst, and a control system for adjusting the fuel-air ratio by means of a control (λ) signal applied to an element on the bases of a signal of a first λ sensor located upstream of the catalyst, the process comprising: stepwise adjusting the λ value by regular increments, at a constant load of the engine; measuring the corresponding activity of the catalyst by means of a second λ sensor located after the catalyst, by measuring at least one of the pressure after the catalyst, and the $NO_x$ content of the gas after the catalyst; measuring the corresponding λ signals of the second λ sensor, corresponding to each stepwise adjustment of the λ value, and determining the value of the measured λ signal at which the activity of the catalyst considerably increases or decreases; and subsequently adjusting the value of the control λ signal of the first λ sensor to a desired control value on the basis of the measured λ signal at which the catalyst's activity considerably increases or decreases.

2. A process according to claim 1, wherein the adjustment is carried out on the basis of the average of 5 or more measurements.

3. A process according to claim 1, wherein the fuel-air ratio is first controlled at a value in the fuel-rich range (λ=0.995) and then controlled stepwise to the less rich range.

4. A process according to claim 2, wherein the fuel-air ratio is first set at a value less than 0.990 and then increased stepwise to a value >1.000.

5. A process according to claim 4, wherein the size of said steps does not exceed 0.001.

6. A process according to claim 1, wherein the activity of the catalyst is determined by means of the λ signal of the λ sensor after the catalyst, and wherein one member of the group consisting of said signal, a trend thereof, and both, is used to correct the value of the λ signal of the first λ sensor upstream of the catalyst.

7. A process according to claim 1, comprising feeding at least part of the exhaust gas of the gas engine as $CO_2$ fertilization in a greenhouse atmosphere.

8. A process according to claim 1, wherein the adjustment is carried out on the basis of the average of 5 or more measurements;

wherein the fuel-air ratio is first set at a value in a fuel-rich range and then adjusted stepwise to a less fuel-rich range;

wherein the fuel-air ratio is first set at a value less than 0.990 and then increased stepwise to a value >1.000;

wherein the size of each said stepwise increase does not exceed 0.001;

wherein the activity of the catalyst is determined by means of the λ signal of the λ sensor after the catalyst, and one member of the group consisting of said signal, a trend thereof, and both, is used to correct the value of the λ signal of the first λ sensor upstream of the catalyst; and further comprising feeding at least part of the exhaust gas of the gas engine as $CO_2$ fertilization in the greenhouse horticulture.

9. A process for generating at least one member from the group consisting of heat, electricity, and carbon dioxide, by means of a gas engine which is provided with one or more λ sensors, a three-way catalyst, and a control system for adjusting the fuel-air ratio by means of a control (λ) signal to an element on the basis of a signal of a first λ sensor located upstream of the catalyst, comprising: stepwise adjusting the λ value by regular increments, at a constant load of the engine; measuring the corresponding activity of the catalyst; measuring the corresponding λ signals of a second λ sensor located after the catalyst, corresponding to each stepwise adjustment of the λ value; determining the value of the measured λ signal at which the activity of the catalyst considerably increases or decreases; and subsequently adjusting the value of the control λ signal of the first λ sensor to a desired control value on the basis of the measured λ signal at which the catalyst's activity considerably increases or decreases.

10. A process according to claim 2, wherein the adjustment is carried out on the basis of the average 5 or more measurements.

11. A process according to claim 9, wherein the fuel-air ratio (λ) is first set at a value in a fuel-rich range (λ=0.995) and then adjusted stepwise to a less fuel-rich range.

12. A process according to claim 11, wherein the fuel-air ratio is first adjusted at a value less than 0.990 and then increased stepwise to a value >1.000.

13. A process according to claim 12, wherein the size of each said stepwise increase does not exceed 0.001.

14. A process according to claim 9, wherein the activity of the catalyst is determined by means of the λ signal of the λ sensor after the catalyst, and wherein one member of the group consisting of said signal, a trend thereof, and both, is used to correct the value of the λ signal of the first λ sensor upstream of the catalyst.

15. A process according to claim 2, comprising feeding at least part of the exhaust gas of the gas engine as $CO_2$ fertilization in a greenhouse atmosphere.

16. A process according to claim 9, wherein the adjustment is carried out on the basis of the average of 5 or more measurements;

wherein the fuel-air ratio is first set at a value in a fuel-rich range and then adjusted stepwise to a less fuel-rich range;

wherein the fuel-air ratio is first set at a value less than 0.990 and then increased stepwise to a value >1.000;

wherein the size of each said stepwise increase does not exceed 0.001;

wherein the activity of the catalyst is determined by means of the λ signal of the λ sensor after the catalyst, and one member of the group consisting of said signal, a trend thereof, and both, is used to correct the value of the λ signal of the first λ sensor upstream of the catalyst; and further comprising feeding at least part of the exhaust gas of the gas engine as $CO_2$ fertilization in the greenhouse horticulture.

* * * * *

UNITED STATES PATENT AND TRADEMARK OFFICE
CERTIFICATE OF CORRECTION

PATENT NO. : 5,946,905
DATED : September 7, 1999
INVENTOR(S) : Willem Hedrik Bouwman It is certified that error appears in the above-identified patent and that said Letters Patent is hereby corrected as shown below:

Column 1,
Line 16, "unbrined" should read -- unburned --;
Line 65, "then" should read -- than --;
Line 66, "g/Gj" should read -- g/GJ --;

Column 7, claim 1,
Line 28, "bases" should read -- basis --;

Column 7,
Line 48, "($\lambda$=0.995)" should read -- ($\lambda$>0.995) --; and

Column 8,
Line 34, "($\lambda$=0.995)" should read -- ($\lambda$>0.995) --.

Signed and Sealed this

Twenty-sixth Day of February, 2002

Attest:

Attesting Officer

JAMES E. ROGAN
Director of the United States Patent and Trademark Office